(12) United States Patent
Jwa et al.

(10) Patent No.: US 7,623,563 B2
(45) Date of Patent: Nov. 24, 2009

(54) APPARATUS AND METHOD FOR DETECTING SPACE-TIME MULTI-USER SIGNAL OF BASE STATION HAVING ARRAY ANTENNA

(75) Inventors: Hye-Kyung Jwa, Daejon (KR); Kyung Park, Daejon (KR); Seung-Chan Bang, Daejon (KR); Young-Hoon Kim, Daejon (KR); Sang-Woo Nam, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 617 days.

(21) Appl. No.: 11/284,688

(22) Filed: Nov. 21, 2005

(65) Prior Publication Data

US 2006/0126753 A1 Jun. 15, 2006

(30) Foreign Application Priority Data

Dec. 9, 2004 (KR) ...................... 10-2004-0103776

(51) Int. Cl.
*H04B 1/00* (2006.01)
(52) U.S. Cl. ...................... 375/144; 370/334; 370/441; 455/456.5; 455/525; 455/560; 455/561; 706/24
(58) Field of Classification Search ................ 370/208, 370/334, 335, 441; 375/130, 144, 152; 455/272, 455/562.1
See application file for complete search history.

(56) References Cited

U.S. PATENT DOCUMENTS

| 6,466,611 B1 | 10/2002 | Bachu et al. | |
| 2003/0048800 A1* | 3/2003 | Kilfoyle et al. | 370/441 |
| 2004/0146024 A1* | 7/2004 | Li et al. | 370/334 |

(Continued)

FOREIGN PATENT DOCUMENTS

JP 2002-198879 7/2002

(Continued)

OTHER PUBLICATIONS

IEEE Transactions on Vehicular Technology, vol. 49, No. 2, Mar. 2000, pp. 293-306.

(Continued)

*Primary Examiner*—Mohammad H Ghayour
*Assistant Examiner*—Adolf Dsouza
(74) *Attorney, Agent, or Firm*—Blakely Sokoloff Taylor & Zafman

(57) ABSTRACT

An apparatus and method for detecting a space-time multi-user signal are disclosed. The apparatus includes: an RF/IF processing unit for converting received signals through an array antenna into digital baseband signals; a splitting unit for dividing the digital baseband signals into data signals and reference signals; a estimating unit for estimating a delay time information and a channel impulse response; a vector generating unit for receiving the reference signals and the delay time information of to thereby generate a beamforming weight vector; a matrix generating unit for receiving the channel impulse response and the beamforming weight vector to there by generate a system matrix; a filtering unit for receiving the data signals and the system matrix to multiply the system matrix to data per each antenna; a antenna combining unit for combining signals outputted from the filtering unit; and an interference cancelling unit for cancelling an interference signal.

11 Claims, 6 Drawing Sheets

U.S. PATENT DOCUMENTS

2004/0198452 A1* 10/2004 Roy ........................ 455/562.1
2005/0107057 A1* 5/2005 Sun ............................ 455/272

FOREIGN PATENT DOCUMENTS

| KR | 1020010011216 A | 2/2001 |
|---|---|---|
| KR | 1020010102530 A | 11/2001 |
| KR | 1020030034259 A | 5/2003 |
| KR | 1020050021110 A | 3/2005 |

OTHER PUBLICATIONS

Combined Spatial Filter and Joint Detector, Proceedings of International Conference on Communications, vol. 3, May 2003, pp. 2091-2093.

* cited by examiner

FIG. 4
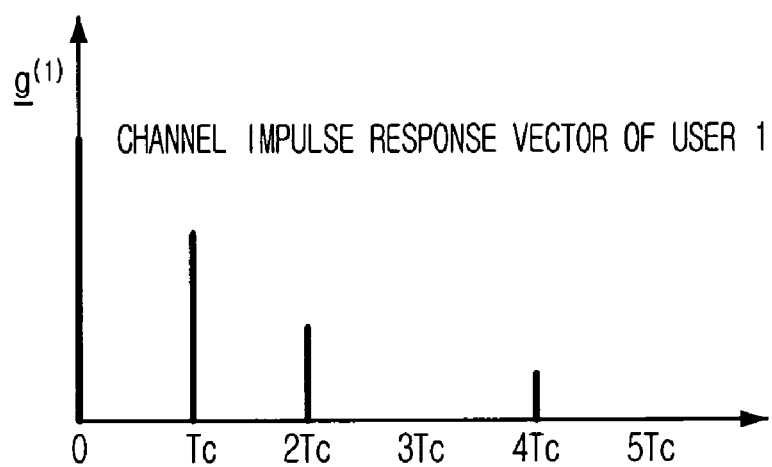
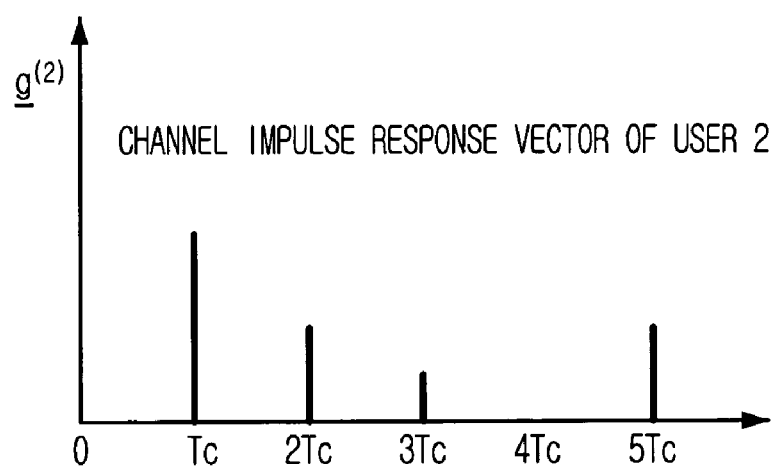

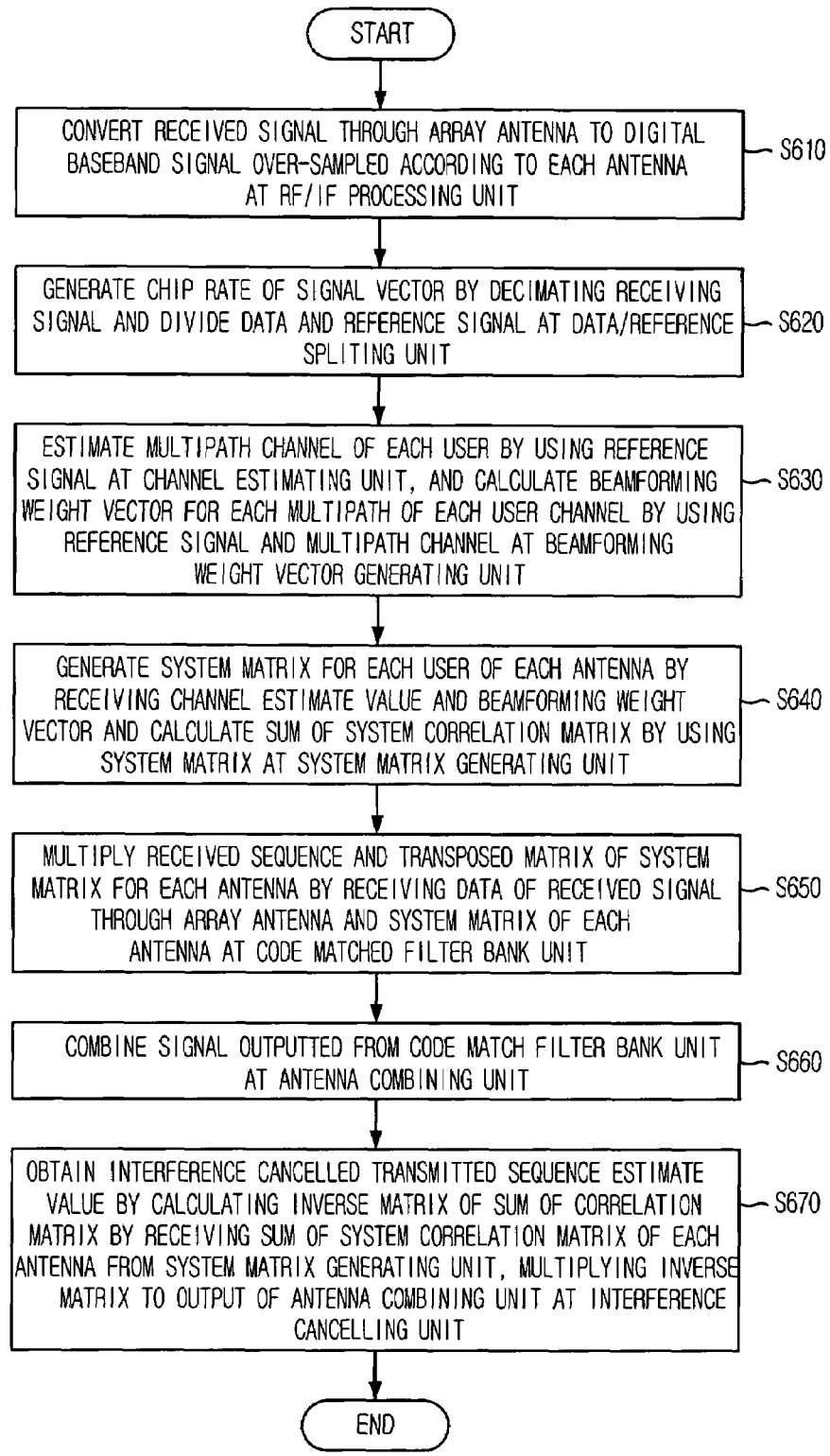

APPARATUS AND METHOD FOR DETECTING SPACE-TIME MULTI-USER SIGNAL OF BASE STATION HAVING ARRAY ANTENNA

FIELD OF THE INVENTION

The present invention relates to an apparatus and method for detecting space-time multi-user signal of a base station having an array antenna; and, more particularly, to an apparatus and method for detecting a space-time multi-user signal of a base station having an array antenna by estimating a vector channel impulse response based on accurately estimated space-time information, generating a system matrix based on the estimated vector channel impulse response and a user's code, and eliminating interference of the received signal by applying the system matrix to a zero forcing block linear equalizer.

DESCRIPTION OF THE PRIOR ART

Primary factors degrading a performance of a code division multiple access (CDMA) base station system are multiple access interference (MAI) and a multipath fading.

In order to cancel the primary factors degrading the performance of the CDMA base station system, a multipath fading is eliminated by using a rake receiver to properly mix a desired signal and a separable multi-path signal of the desired signal. However, the rake receiver may be the optimal receiver in single user environment and furthermore a performance of the rake receiver is seriously degraded by MAI in a multi-user environment.

As a conventional technology to eliminate MAI, a multi-user detector is used to simultaneously detect multi-user signals while cancelling interference between them.

As another conventional technology to eliminate MAI, an array antenna is used in a base station to enhance the desired signal and mitigate the interference effects from other users. The base station having the array antenna provides better performance and increase capacity than a base station using single antenna. However, the receiver of the base station having the array antenna requires a module for multiplying and combining a beamforming weight according to a rake fingers since the receiver becomes equivalent to a space-time rake receiver. Therefore, it is very difficult to implement the space-time rake receiver to support many users.

Recently, there is growing interest in a space-time multi-user detector including an array antenna and a multi-user detector for providing better performance.

An optimized receiver and a linear receiver for a CDMA system was introduced by Xiadong Wang and H. Vicent Poor in an article entitled "Space-Time Multi-user Detection in Multipath CDMA channels", IEEE transactions on Signal Processing, vol. 47, no. 9, pp. 2356-2374, 1997. The introduced receivers include a multi-user detector and are operated based on a space-time processing method. The introduced receivers are proper to a consecutive transmission method. However, the introduced receivers require a module for multiplying an array antenna response vector to a back-diffused signal for each rake finger and combining the multiplying results because the introduced receivers cancel interference signal by allocating a rake finger to separable multipath for users using identical channel, performing a back-spreading on corresponding path of each user per each rake finger and estimating an array antenna response vector.

Another conventional technology is introduced by K. Lun and Z. Zhang in an article entitled "Combined Spatial Filter and Joint Detector" in Proceedings of International Conference on Communication, vol. 3, May, 2003. In the article, K. Lun and Z. Zhang introduces a technology for a space-time multi-user detector satisfying a zero forcing analysis algorithm in a block transmission type time division synchronized CDMA (TD-SCDMA). That is, the introduced technology obtaining a space diversity estimates a channel by using a channel estimating unit for each user per each antenna and estimates data sequence of each user through a block linear equalizer. However, a vector channel cannot be accurately estimated because of low usability of channel space information. That is, the usability of channel space information is lowered since the conventional technology estimates a channel according to each antenna.

Furthermore, anther conventional space-time multi-user detector in a block transmission type time division synchronize code division multiple access (TD-SCDMA) is introduced by J. J. Blanz, A. Papathanassiou, M, Haadrt, I. Furio, P. W. Baier in an article entitled "Smart Antenna for Combined DOA and Joint Channel Estimation in Time-Slotted CDMA Mobile Radio System with Joint Detection", in IEEE Transaction on Vehicular Technology, vol. 49, no. 2, pp. 293-306. Another conventional space-time multi-user detector is a combination of a beam former and a multi-user detector. That is, another conventional space-time multi-user detector eliminates ISI and MAI through combined signals per each user after estimating directivities of all users based on signal received from each antenna and forming a beam for multipath of each user. Since the conventional space-time multi-user detector is additionally included in a space-time rake receiver, a module multiplying and combining beamforming weight vector per a rake finger is additionally required. Therefore, it is also difficult to implement a base station to support many users.

SUMMARY OF THE INVENTION

It is, therefore, an object of the present invention to provide an apparatus and method for detecting a space-time multi-user signal of a base station having an array antenna by estimating a vector channel impulse response based on accurately estimated space-time information, generating a system matrix based on the estimated vector channel impulse response and a user's code, and eliminating interference of the received signal by applying the system matrix to a zero forcing block linear equalizer.

In accordance with one aspect of the present invention, there is provided an apparatus for detecting a space-time multi-user signal in a base station having an array antenna, including: a radio frequency (RF)/intermediate frequency (IF) processing unit for converting received signals through an array antenna into digital baseband signals by over-sampling each received signal corresponding to each antenna; a data/reference splitting unit for receiving the digital baseband signals and dividing the digital baseband signals into data signals and reference signals; a channel estimating unit for receiving the reference signals and estimating a delay time information of paths for each user and a channel impulse response corresponding to each path per antenna; a beamforming weight vector generating unit for receiving the reference signals and the delay time information of to thereby generate a beamforming weight vector of each path; a system matrix generating unit for receiving the channel impulse response and the beamforming weight vector to there by generate a system matrix and calculating a correlation matrix of the system matrix for each antenna and a sum of the correlation matrix; a code matched filter BANK unit for receiving the data signals and the system matrix to multiply the system matrix to the data signals per each antenna; a antenna combining unit for combining signals outputted from the code matched filter BANK unit; and an interference cancelling unit for cancelling an interference signal of output of the antenna combining unit by using the sum of the correlation matrix.

In accordance with another aspect of the present invention, there is provided a method for detecting a space-time multi-user signal, including the steps of: a) converting received signals through an array antenna to digital baseband signals; b) dividing the digital baseband signals to data signals and reference signal signals; c) estimating a delay time information of paths for each user and a channel impulse response corresponding to each path per antenna by using the reference signals; d) generating a beamforming weight vector of each path by using the reference signals and the delay time information; e) generating a system matrix of each antenna by using the channel impulse response and the beamforming weight vector and calculating a correlation matrix of the system matrix for each antenna and a sum of the correlation matrix; f) multiplying a transpose matrix of a system matrix for each antenna and a received sequence by using the data signals and a the system matrix, and combining the multiplying results; and g) obtaining a transmitted sequence value by cancelling an interference by multiplying the combined value and an inverse matrix of the sum of the correlation matrix.

BRIEF DESCRIPTION OF THE DRAWINGS

The above and other objects and features of the present invention will become apparent from the following description of the preferred embodiments given in conjunction with the accompanying drawings, in which:

FIG. 4 is a graph for explaining a channel impulse response vector of each user in an apparatus for detecting a space-time multi-user signal in accordance with a preferred embodiment of the present invention;

FIG. 6 is a flowchart of a method for detecting a space-time multi-user signal in an array antenna base station in accordance with a preferred embodiment of the present invention.

DETAILED DESCRIPTION OF THE PREFERRED EMBODIMENTS

Figure 1:
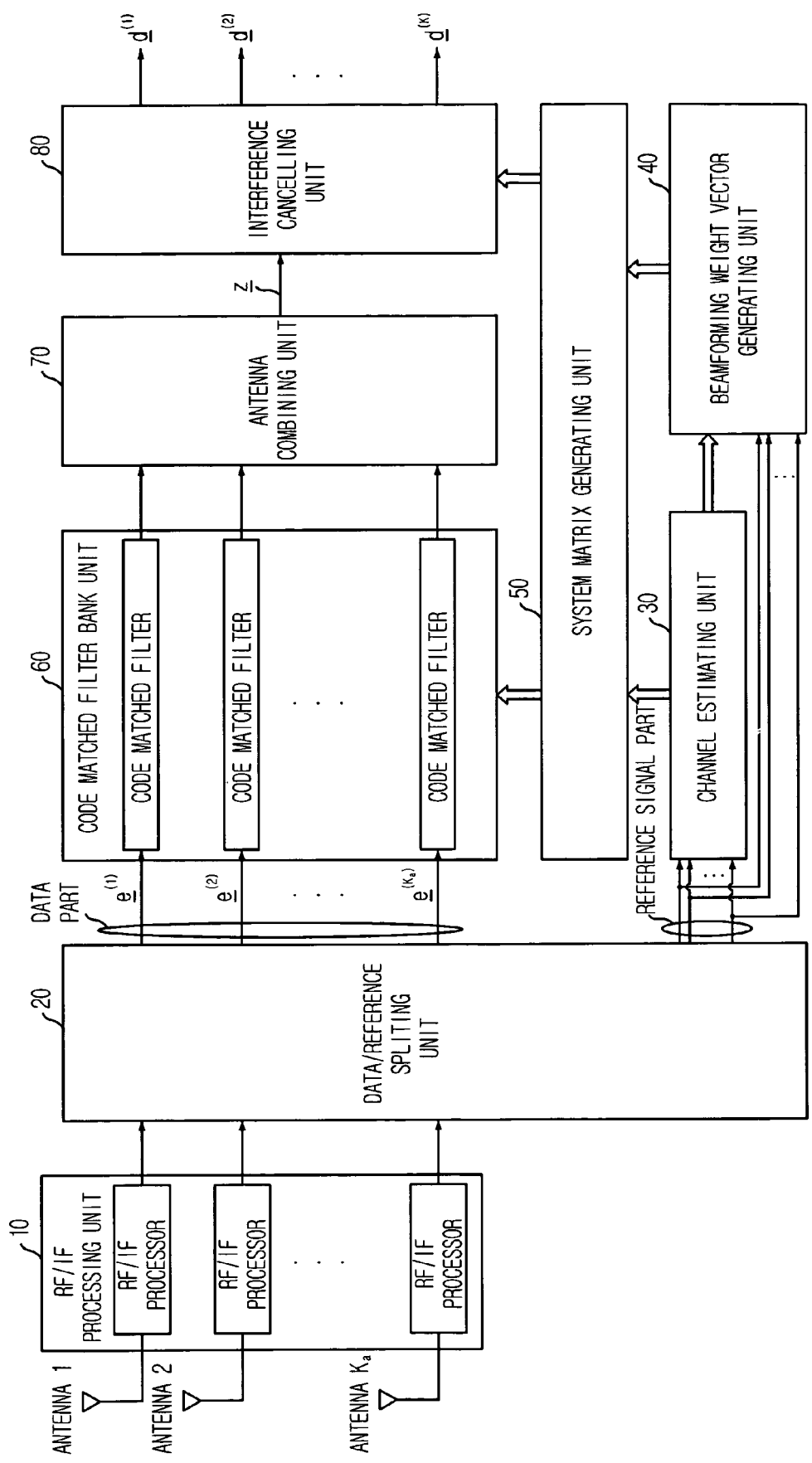
FIG. 1 is a block diagram illustrating an apparatus for detecting a space-time multi-user signal in an array antenna base station in accordance with a preferred embodiment of the present invention.

Reference will now be made in detail to the preferred embodiments of the present invention, examples of which are illustrated in the accompanying drawings.

At first, a space-time multi-user detector in a base station using an array antenna will be explained by using below equations.

It assumes that a base station having a linear array with $K_a$ antenna elements provides services to K users simultaneously. If a data block transmitted by $k^{th}$ user is $\underline{d}^{(k)} = [d_1^{(k)}, d_2^{(k)}, \ldots, d_{N_k}^{(k)}]^T$ when each user transmits $N_k$ data symbols, a sum of data symbols of all users is expressed as $N_t$. The data block sequence $\underline{d}$ of K users can be expressed by following Eq. 1.

$$\underline{d} = [\underline{d}^{(1)T}, \ldots, \underline{d}^{(2)T}, \ldots, \underline{d}^{(K)T}]^T = [d_1^{(1)}, d_2^{(1)}, \ldots, d_{N_1}^{(1)}, d_2^{(2)}, d_{N_2}^{(2)}, \ldots, d_1^{(K)}, d_2^{(K)}, \ldots, d_{N_K}^{(K)}]^T \quad \text{Eq. 1}$$

Also, each data symbol is spread by a user's unique spreading code $\underline{c}_q^{(k)}, q=1,2,\ldots,Q_k, k=1,2,\ldots,K$ which has a length of $Q_k$. Therefore, a chip sequence transmitted data block of each user can be expressed as following Eq. 2.

$$s_i^{(k)} = \sum_{n=1}^{N_k} d_n^{(k)} c_{i-(n-1)Q_k}^{(k)}, \quad i = 1, 2, \ldots, N_c Q_c; \quad \text{Eq. 2}$$

$$k = 1, 2, \ldots, K$$

In Eq. 2, $N_c Q_c$ is the number of chips during a data block, and it becomes identical for all users within a base station.

It assumes that the W is the maximum delay spread assumed integer multiple of chip period, the W-paths fading channel impulse response vector of each user can be written by W×1 vector $\underline{g}^{(k)}, k=1,2,\ldots,K$, where the element of $\underline{g}^{(k)}, k=1,2,\ldots,K$ is the complex Rayleigh fading gain of the multipaths of $k^{th}$ user.

Also, if an array response of $k_a^{th}$ antenna of $k^{th}$ user for all path is W×1 vector $\underline{a}^{(k,k_a)}, k=1,2,\ldots,K, k_a=1,2,\ldots,K_a$, a vector channel impulse response $\underline{h}^{(k,k_a)}$ of $k_a^{th}$ antenna is W×1 vector expressed as following Eq. 3.

$$\underline{h}^{(k,k_a)} = \underline{g}^{(k)} \circ \underline{a}^{(k,k_a)}, k=1,2,\ldots,K_a \quad \text{Eq. 3}$$

where $\circ$ denotes element-wise product.

Considering the received signal model of a data block except a reference signal, the received sequence of $k_a^{th}$ antenna is the sum of the convolution of the transmitted chip sequence of length $N_c Q_c$ with the vector channel impulse response $\underline{h}^{(k,k_a)}$, and perturbed by noise sequence $n^{(k_a)}$ of length $N_c Q_c + W - 1$, $$e_i^{(k_a)} = \sum_{k=1}^{K} \underline{h}^{(k,k_a)} * s_i^{(k)} + \underline{n}_i^{(k_a)} \quad \text{Eq. 4}$$

$$= \sum_{k=1}^{K} \sum_{w=1}^{W} \sum_{n=1}^{N_k} a_w^{(k,k_a)} g_w^{(k)} d_n^{(k)} c_{i-(n-1)Q_k-w+1}^{(k)} + \underline{n}_i^{(k_a)},$$

$$i = 1, 2, \ldots, N_c Q_c + W - 1$$

The total received sequence $\underline{e}$ of length $K_a(N_c Q_c + W - 1)$ at all $K_a$ antennas is expressed as $\underline{e} = \underline{A} \cdot \underline{d} + \underline{n}$.

where, $\underline{A}$ is called a system matrix of $K_a(N_c Q_c + W - 1) \times N_t$, which elements consist of the convolution of a vector channel impulse response $\underline{h}^{(k,k_a)}$ with a unique spreading code of a user. And a vector $\underline{n}$ is the combined noise vector at all $K_a$ antennas with noise covariance matrix $R_{nn} = E\{\underline{n}\underline{n}^H\}$ In order to estimate a transmitted sequence $\underline{d}$ based on a total received sequence, a zero forcing block linear equalizer (ZF-BLE) is generally used. The zero forcing block linear equalizer obtains $\underline{d}$ that maximizes a likelihood ratio function. The estimation value $\underline{d}$ can be calculated by following Eq. 5.

$$\hat{d} = (\underline{A}^H R_{nn}^{-1} \underline{A})^{-1} \underline{A}^H R_{nn}^{-1} \underline{e} \qquad \text{Eq. 5}$$

A space-time multi-user detector according to the present invention is constructed by simplifying Eq. 5 to a below Eq. 6 through assuming a noise covariance matrix as $R_{nn} = \sigma_n^2 I$.

$$\hat{d} = (\underline{A}^H \underline{A})^{-1} \underbrace{\underline{A}^H \underline{e}}_{\underline{z}} \qquad \text{Eq. 6}$$

In the present invention, a base station can detects a transmitted sequence of space-time multi-user by using a mathematical method and a space-time multi-user detection apparatus according to the present invention will be explained with reference to the above mentioned equations and accompanying drawings.

FIG. 1 is a diagram illustrating an apparatus for detecting a space-time multi-user signal in a base station using an array antenna in accordance with a preferred embodiment of the present invention.

As shown in FIG. 1, the apparatus for detecting a space-time multi-user signal includes a RF/IF processing unit 10, a data/reference splitting unit 20, a channel estimating unit 30, a beamforming weight vector generating unit 40, a system matrix generating unit 50, a code matched filter BANK unit 60, a antenna combining unit 60 and an interference cancelling unit 80.

The RF/IF processing unit 10 converts a signal received through an array antenna to a digital baseband signal by over-sampling the received signal according to each antenna.

The array antenna includes $K_a$ antenna array elements.

The data/reference splitting unit 20 generates a signal vector of a chip rate through decimation by receiving the digital baseband signal from the RF/IF processing unit 10, and divides to data and a reference signal.

The channel estimating unit 30 receives the reference signal from the data/reference splitting unit 20 and estimates a delay time information of each path of each user, and estimates a channel impulse response of each path of each user per each antenna.

Figure 2:
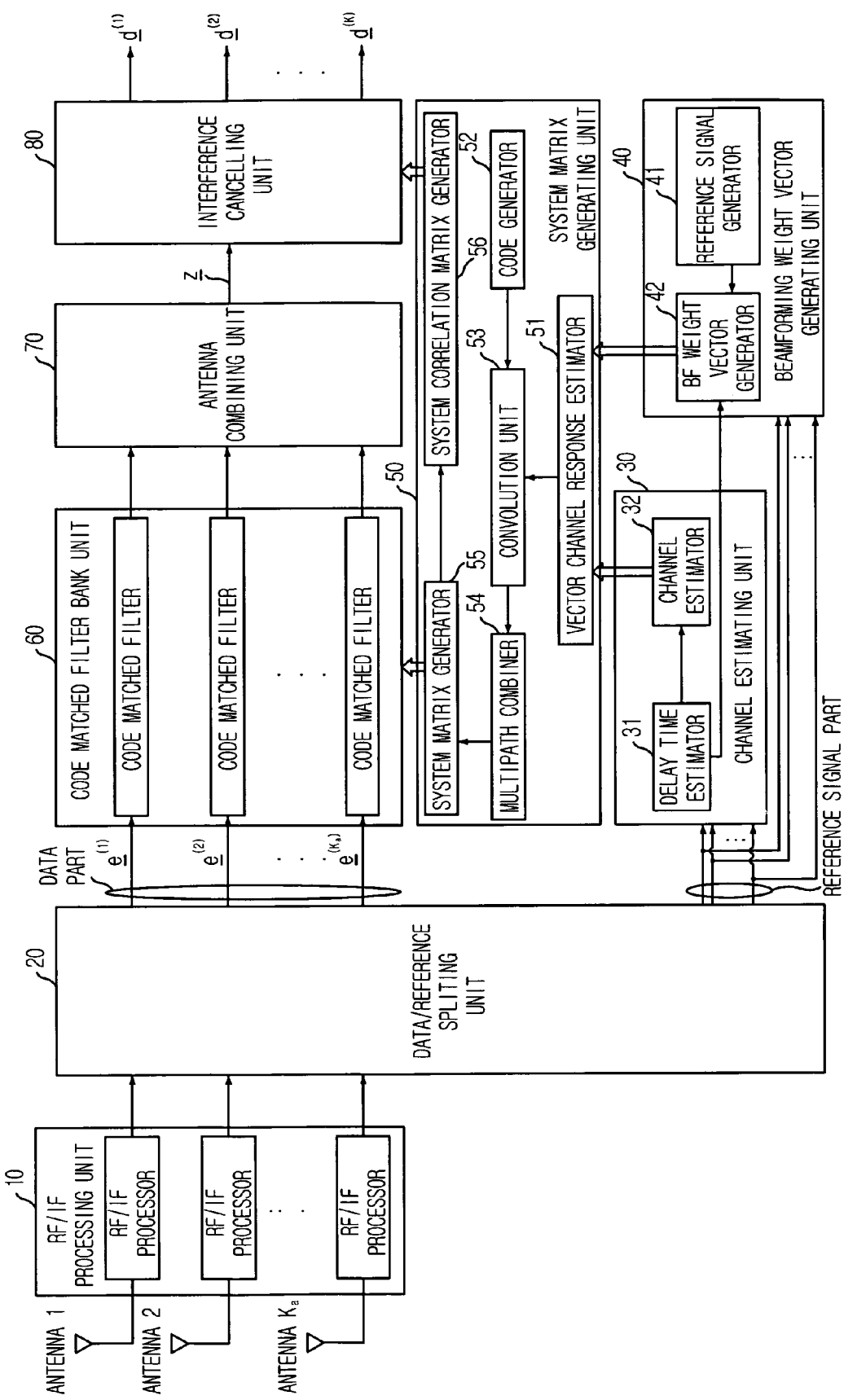
FIG. 2 is a detailed diagram illustrating an apparatus for detecting a space-time multi-user signal in an array antenna base station in accordance with a preferred embodiment of the present invention.

Details of the channel estimating unit 30 are shown in FIG. 2. The channel estimating unit 30 includes a delay time estimator 31 and a channel estimator 32. The delay time estimator 31 estimates the delay time information of each path of each user from the reference signal vector from the data/reference splitting unit 20 and the channel estimator 32 estimates a channel impulse response for each path of each user per each antenna.

The beamforming weight vector generating unit 40 receives the reference signal from the data/reference splitting unit 20 and the delay time information from the channel estimating unit 30, and calculates a beamforming weight vector for each path of each user's.

As shown in FIG. 2, the beamforming weight vector generating unit 40 includes a reference signal generator 41 and a vector generator 42. The reference signal generator 41 generates a reference signal of each user and the vector generator 42 generates a beamforming weight vector for each path of each user by using reference signal vectors received through each antenna and the generated reference signal from the vector generator 42 based on the delay time information from the channel estimating unit 30.

The system matrix generating unit 50 receives the channel impulse response of each path of each user from the channel estimating unit 30 and the beamforming weight vector from the beamforming weight vector generating unit 40, and makes a system matrix for each antenna and calculates a correlation matrix of the system matrix for each antenna, and adds the correlation matrix of each antenna.

As shown in FIG. 2, the system matrix generating unit 50 includes a vector channel response estimator 51, a code generating unit 52, a convolution unit 53, a multipath mixer 54, a system matrix generator 55 and a system correlation matrix generator 56.

The vector channel response estimator 51 estimates a vector channel impulse response for each path of each user and code generating unit 52 generates a spreading code of each user.

The convolution unit 53 generates a column vector by convoluting each user's code from the code generating unit 52 and the vector channel impulse response from the vector channel response estimator 51 for each path of each user per each antenna.

After generating the column vector, the multipath combiner 54 combines the column vector to the multipath according to each path and the system matrix generator 55 obtains a matrix per each antenna by consisting of the combined column vector.

The system correlation matrix generating unit 56 obtains a correlation matrix of the system matrix per each antenna by using a system matrix generated at the system matrix generator 55 and calculates a sum of the correlation matrices.

The system matrix generated from the system matrix generator 55 is transferred to the code matched filter BANK unit 60 and the sum of correlation matrices of the system matrix is transferred to the interference cancelling unit 80.

The code matched filter BANK unit 60 receives the data from the data/reference splitting unit 20 and the system matrix $\underline{A}$ from the system matrix generating unit 50 and multiplies a Hermitian transpose matrix of the system matrix for each antenna with a received sequence $\underline{e}$.

The antenna combining unit 70 combines outputs from $K_a$ code matched filters of the code matched filter BANK unit 60.

That is, the code matched filter BANK unit 60 and the antenna combining unit 70 are operated as $\underline{z} = \underline{A}^H \underline{e}$ in Eq. 6

The interference cancelling unit 80 cancels interference signal by using the sum of the correlation matrices from the system matrix generating unit 50 and a combined vector from the antenna combining unit 70. That is, the interference signal cancelling unit 80 performs operations expressed as $(\underline{A}^H \underline{A})^{-1} \underline{z}$ in Eq. 1 and obtains a transmitted sequence estimating value $\underline{d}$ by receiving the sum of the correlation matrixes of a system matrix of each antenna from the system matrix generating unit 50, calculating a inverse matrix of the sum of the correlation matrices and multiplying the inverse matrix to outputs of the antenna combining unit 70.

The channel estimating unit 30, the beam weight vector generating unit 40 and the system matrix generating unit 50 will be explained in detail with reference to FIGS. 3 to 5.

The system matrix $\underline{A}$ is a matrix of $K_a(N_c Q_c + W - 1) \times N_t$ constructed with column vectors each of which is a user's vector channel impulse response convoluted with a user's unique spreading code. The convolution of a user's unique spreading code $\underline{c}^{(k)}$ of a $k^{th}$ user of a $k_a^{th}$ antenna in one data symbol period and a user's vector channel impulse response $\underline{h}^{(k,k_a)}$ is shown in Eq. 7.

$$\underline{b}^{(k,k_a)} = \underline{c}^{(k)} * \underline{h}^{(k,k_a)} = \left( b_1^{(k,k_a)} b_2^{(k,k_a)} \cdots b_{Q_k+W-1}^{(k,k_a)} \right)^T, \qquad \text{Eq. 7}$$

$$k_a = 1, 2, \cdots, K_a, \quad k = 1, 2, \cdots, K$$

All of users K for $k_a{}^{th}$ antenna and a matrix $\underline{A}^{(k_a)}$ for $N_k$,k=1,2, . . . ,K can be constructed as below Eq. 8.

$$A^{(k_a)} = \left(A_{ij}^{(k_a)}\right), \quad i = 1, 2, \ldots, N_c Q_c + W - 1; j = 1, 2, \ldots, K_t \quad \text{Eq. 8}$$

$$A_{Q_k \cdot (n-1)+l, N_k \cdot (k-1)+n}^{(k_a)} = \begin{cases} b_l^{(k,k_a)} & \text{for } n = 1, 2, \ldots, N_k; l = 1, 2, \ldots, \\ & Q_k + W - 1; k = 1, 2, \ldots, K \\ 0 & \text{else} \end{cases}$$

Figure 3:
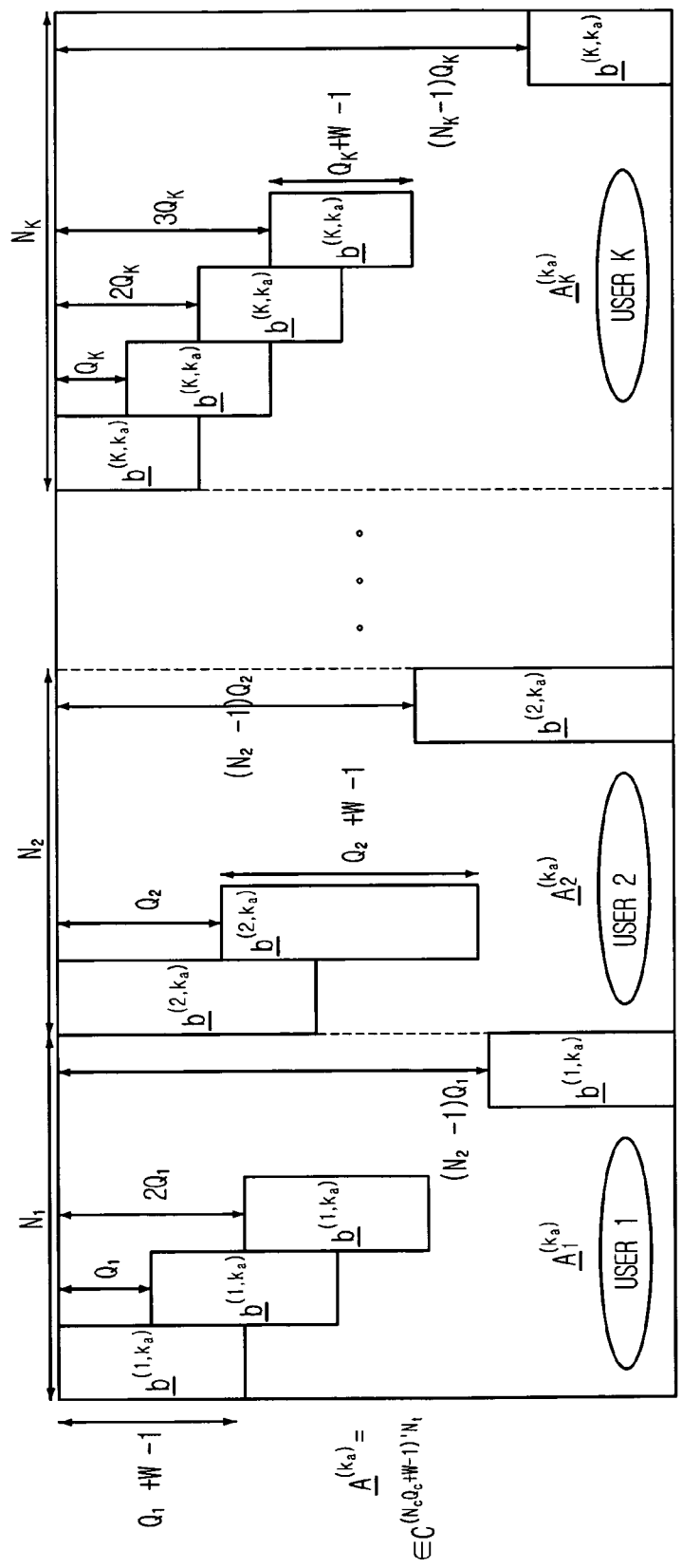
FIG. 3 is a diagram for explaining a structure of a system matrix of an antenna in an apparatus for detecting a space-time multi-user signal in accordance with a preferred embodiment of the present invention.

FIG. 3 shows a structure of a system matrix $\underline{A}^{(k_a)}$ of $k_a{}^{th}$ antenna based on Eq. 8. If the number of users is 2 (K=2), a size of data block of $1^{st}$ user is 3 ($N_1$=3), a spreading factor is 2 ($Q_1$=2), a size of data block of $2^{nd}$ user is 2 ($N_2$=2) and a spreading factor is 3 ($Q_2$=3), and a maximum delay spread is 6 chips (W=6), a channel impulse response of the user is shown in FIG. 4 and a structure of a system matrix $\underline{A}^{(k_a)}$ for $k_a{}^{th}$ antenna is shown below.

$$\underline{A}^{(k_a)} = \begin{bmatrix} b_1^{(1,k_a)} & & & 0 & \\ b_2^{(1,k_a)} & & & b_2^{(2,k_a)} & \\ b_3^{(1,k_a)} & b_1^{(1,k_a)} & & b_3^{(2,k_a)} & \\ b_4^{(1,k_a)} & b_2^{(1,k_a)} & & b_4^{(2,k_a)} & 0 \\ b_5^{(1,k_a)} & b_3^{(1,k_a)} & b_1^{(1,k_a)} & b_5^{(2,k_a)} & b_2^{(2,k_a)} \\ b_6^{(1,k_a)} & b_4^{(1,k_a)} & b_2^{(1,k_a)} & b_6^{(2,k_a)} & b_3^{(2,k_a)} \\ 0 & b_5^{(1,k_a)} & b_3^{(1,k_a)} & b_7^{(2,k_a)} & b_4^{(2,k_a)} \\ & b_6^{(1,k_a)} & b_4^{(1,k_a)} & b_8^{(2,k_a)} & b_5^{(2,k_a)} \\ & 0 & b_5^{(1,k_a)} & & b_6^{(2,k_a)} \\ & & b_6^{(1,k_a)} & & b_7^{(2,k_a)} \\ & & 0 & & b_8^{(2,k_a)} \end{bmatrix}$$

$$\underline{A}_1^{(k_a)} \qquad \underline{A}_2^{(k_a)}$$

As shown, a system matrix $\underline{A}^{(K_a)}$ of $k_a{}^{th}$ antenna can be obtained as a user's code and a vector channel impulse response and it can be used as the system matrix in regardless of synchronization of each user's signal.

Since the user's code is already known, the vector channel impulse response can be obtained in the system matrix generating unit 50 through output of the channel estimating unit 30 and the beamforming weight vector generating unit 40.

Hereinafter, generation of a system matrix will be explained with reference to FIG. 5.

Figure 5:
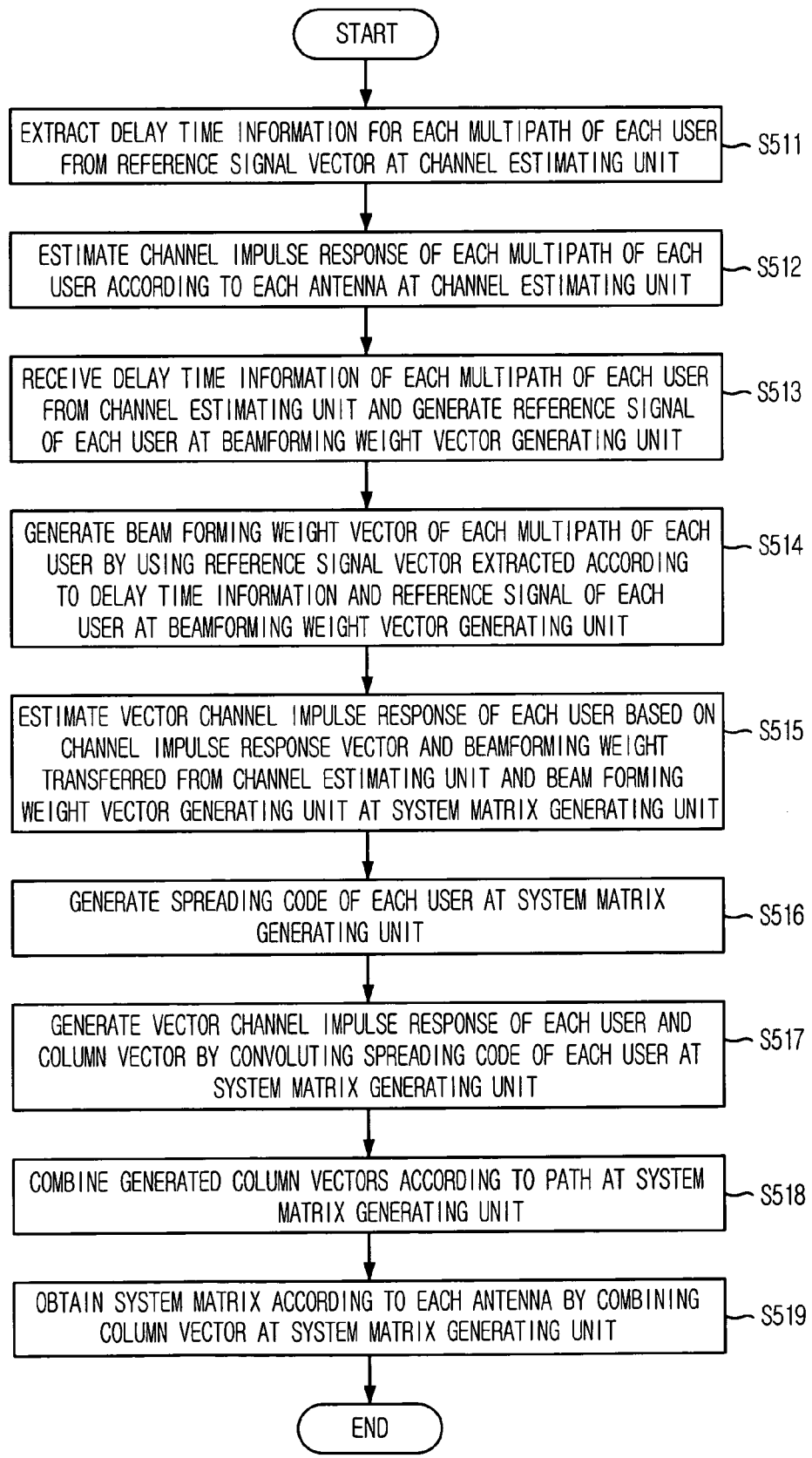
FIG. 5 is a flowchart of generation of a system matrix in a method for detecting a space-time multi-user signal in an array antenna base station in accordance with a preferred embodiment of the present invention.

FIG. 5 is a flowchart showing generation of a system matrix in a method for detecting a space-time multi user in an array antenna base station in accordance with a preferred embodiment of the present invention.

The channel estimating unit 30 extracts a delay time information for each path of each user from a reference signal vector received according to each antenna, which is divided from the data/reference splitting unit 20 at step S511.

The channel estimating unit 30 estimates a channel impulse response $\underline{h}_a^{(k,k_a)}$,k=1,2, . . . ,K,$k_a$1,2, . . . ,$K_a$ for each path of each user per each antenna at step S512.

The beamforming weight generating unit 40 generates a reference signal of each user by receiving the delay time information for the each path of each user from the channel estimating unit 30 at step S513.

The beamforming weight vector generating unit 40 generates a beamforming weight vector of each path of each user by using a reference signal vector extracted according to the delay time information and a reference signal of each user at step S514.

That is, the beamforming weight vector generating unit 40 generates the beamforming weight reference vector $\underline{w}^{(k,k_a)}$,k=1,2, . . . ,K,$k_a$=1,2, . . . ,$K_a$ by using various algorithms requiring the reference signal such as a sample matrix inversion (SMI) algorithm, a normalized-least mean square (N-LMS) algorithm, a recursive least square (RLS) algorithm or a maximal ratio combining algorithm.

The system matrix generating unit 50 estimates W×1 of each user's vector channel impulse response from the channel impulse response vector and the beamforming weight vector from the channel estimating unit 30 and the beamforming weight vector generating unit 50 at step S515.

The channel impulse response vector $\hat{\underline{g}}^{(k)}$ can be expressed as below Eq. 9 and each user's vector channel impulse response $\hat{\underline{h}}^{(k,k_a)}$ can be expressed as below Eq. 10.

$$\hat{\underline{g}}^{(k)} = \sum_{k_a=1}^{K_a} \underline{w}_a^{(k,k_a)*} \cdot \underline{h}_a^{(k,k_a)}, \quad k = 1, 2, \ldots, K \quad \text{Eq. 9}$$

$$\hat{\underline{h}}^{(k,k_a)} = \underline{w}^{(k,k_a)} \cdot \hat{\underline{g}}^{(k)}, \quad k = 1, 2, \ldots, K, k_a = 1, 2, \ldots, K_a \quad \text{Eq. 10}$$

The system matrix generating unit 50 generates a spreading code of each user at step S516.

The system matrix generating unit 50 generates a column vector by convoluting the vector channel impulse response of each user and a code of each user at step S517.

The column vectors are combined according to a path at step S518. That is, the system matrix generating unit 50 $\underline{b}^{(k,k_a)}$,k=1,2, . . . ,K,$k_a$=1,2, . . . ,$K_a$ by combining W column vectors for each path.

The system matrix generating unit 50 obtains a system matrix of each antenna by combining the column vectors at step S519. That is, the system matrix generating unit 50 obtains system matrix $\underline{A}^{(k_a)}$,$k_a$=1,2, . . . ,$K_a$ of each antenna to be suitable to the $\underline{b}^{(k,k_a)}$, the known number of the users and the number of data symbols of each user.

FIG. 6 is a flowchart showing a method for detecting a space-time multi-user in a base station having an array antenna in accordance with a preferred embodiment of the present invention.

At first, the RF/IF processing unit 10 converts a received signal through the array antenna to a digital baseband signal by over-sampling the received signal according to each antenna at step S610.

The data/reference splitting unit 200 generates a chip rate of signal vector by decimating the received signal and divides data and a reference signal at step S620.

The channel estimating unit 30 estimates a channel impulse response for each path of each user and a delay time information of each path of each user by using the reference signal, and the beamforming weight vector generating unit 40 calculates the beamforming weight vector for the each path of each user by using the reference signal and the delay time information at step S630.

The system matrix generating unit 50 receives the channel estimating value and the beamforming weight vector, generates a system matrix per each antenna and obtains a sum of correlation matrixes of system matrix at step S640.

Since obtaining of the system correlation matrix is already described with reference to FIG. 5, detailed explanation of the steps 630 and 640 is omitted.

The code matched filter BANK unit 60 receives system matrixes ($\underline{A}^{(k_a)}, k_a=1,2,\ldots,K_a$) of each antenna and data of the received signal, and multiplies Hermitian transpose matrix and the receiving sequence ($\underline{e}$) at step S650.

The antenna combining unit 70 receives signals outputted from the code matched filter BANK unit 60 and combines the outputted signals at step S660.

The interference cancelling unit 80 receives the sum of the correlation matrix of each antenna from the system matrix generating unit 50, calculates a inverse matrix of the sum of the correlation matrix and obtains the transmitted sequence estimating value by multiplying the inverse matrix to outputs of the antenna combining unit 70 to cancel the interference at step S670.

As described above, a space-time multi-user detector according to the present invention estimates a vector channel based on a received signal through an array antenna, forms a system matrix by using the estimated vector channel and a user's code and applies the system matrix to a zero forcing algorithm. Accordingly, the space-time multi-user detector according to the present invention is easy to implement compared to a conventional rake receiver based space-time multi-user detector with a module multiplying and combining beamforming weight vectors according to a rake finger.

Also, the space-time multi-user detector according to the present invention accurately estimates space information of a channel by estimating a vector channel based on a received signal through an antenna. Therefore, a performance of the space-time multi-user detector is dramatically increased.

Furthermore, the space-time multi-user detector according to the present invention can be used as a space-time multi-user detector in synchronous or asynchronous CDMA systems.

The present application contains subject matter related to Korean patent application No. 2004-0103776, filed with the Korean Patent Office on Dec. 9, 2004, the entire contents of which being incorporated herein by reference.

While the present invention has been described with respect to the particular embodiments, it will be apparent to those skilled in the art that various changes and modifications may be made without departing from the scope of the invention as defined in the following claims.

What is claimed is:

1. An apparatus for detecting a space-time multi-user signal in a base station having an array antenna, the apparatus comprising:

a received signal processing means for converting received signals through an array antenna into a digital baseband signals by over-sampling each received signal corresponding to each antenna;

a data/reference splitting means for receiving the digital baseband signals and dividing the digital baseband signals into data signals and reference signals;

a channel estimating means for receiving the reference signals and estimating a delay time information of paths for each user and a channel impulse response corresponding to each path per antenna;

a beamforming weight vector generating means for receiving the reference signals and the delay time information of to thereby generate a beamforming weight vector of each path;

a system matrix generating means for receiving the channel impulse response and the beamforming weight vector to there by generate a system matrix and calculating a correlation matrix of the system matrix for each antenna and a sum of the correlation matrix;

a code matched filtering means for receiving the data signals and the system matrix to multiply the system matrix to the data signals per each antenna;

a antenna combining means for combining signals outputted from the code matched filtering means; and an interference cancelling means for cancelling an interference signal of output of the antenna combining means by using the sum of the correlation matrix.

2. The apparatus as recited in claim 1, wherein the channel estimating means includes:

a delay time estimator for estimating the delay time information of each path each user based on a reference signal vector obtained at the data/reference splitting means; and a channel response estimator for estimating the channel impulse response of each path of each user per each antenna.

3. The apparatus as recited in claim 2, wherein the beamforming weight vector generating means includes:

a reference signal generator for generating a reference signal of each user; and a vector generator for generating a beamforming weight vector of each path of each user by using a reference signal vector received according to each antenna and the generated reference signal from the reference signal generator.

4. The apparatus as recited in claim 3, wherein the system matrix generating means includes:

a vector channel response estimator for estimating a vector channel impulse response of each path of each user;

a code generator for generating a spreading code of each user;

a convolution unit for generating a column vector of each path of each user per each antenna by convoluting the spreading code of each user from the code generator and the vector channel impulse response from the vector channel response estimator;

a multipath combiner for combining the generated column vectors of multipath according to a path;

a system matrix generator for generating a system matrix per each antenna by combining the combined column vectors; and a correlation matrix generator for generating the correlation matrix of the system matrix by using the system matrix generated according to each antenna at the system matrix generator, and calculating the sum of the correlation matrix.

5. The apparatus as recited in claim 4, wherein the vector channel response estimator estimates the channel impulse response of each path of each user by multiplying the estimated channel impulse response of each path of each user per each antenna from the channel estimating means and a conjugate complex number of the beamforming weight vector from the beamforming weight vector generating means.

6. The apparatus as recited in claim 5, wherein the vector channel response estimator obtains a vector channel of each path of each user by multiplying an estimated channel impulse response of each path of each user and a beamforming weight vector from the beamforming weight vector generating means.

7. The apparatus as recited in claim 4, wherein the interference cancelling means cancels interference by receiving the sum of the correlation matrix from the system matrix generating means, obtaining an inverse matrix of the sum and multiplying data from the antenna combining means and the inverse matrix.

8. A method for detecting a space-time multi-user signal, the method comprising the steps of:
- a) converting a received signals through an array antenna to digital baseband signals;
- b) dividing the digital baseband signals to data signals and reference signals;
- c) estimating a delay time information of paths for each user and a channel impulse response corresponding to each path per antenna by using the reference signals;
- d) generating a beamforming weight vector of each path by using the reference signals and the delay time information;
- e) generating a system matrix of each antenna by using the channel impulse response and the beamforming weight vector and calculating a correlation matrix of the system matrix for each antenna and a sum of the correlation matrix;
- f) multiplying a transpose matrix of a system matrix for each antenna and a received sequence by using the data signals and a the system matrix, and combining the multiplying results; and
- g) obtaining a transmitted sequence value by cancelling an interference by multiplying the combined value and an inverse matrix of the sum of the correlation matrix.

9. The method as recited in claim 8, wherein the step c) includes the steps of:
- c-1) extracting the delay time information of each path of each user using the reference signal vector; and
- c-2) estimating the channel impulse response of each path of each user per each antenna.

10. The method as recited in claim 9, wherein the step d) includes the steps of:
- d-1) receiving the delay time information of each path of each user and generating the reference signal; and
- d-2) generating a beamforming weight vector of each path of each user by using the reference signal extracted according to the delay time information and a reference signal of each user.

11. The method as recited in claim 10, wherein the step e) includes the steps of:
- e-1) estimating a vector channel impulse response by using the channel impulse response vector and the beamforming weight vector;
- e-2) generating a spreading code of each user;
- e-3) generating a column vector by convoluting the vector channel impulse response of each user and the spreading code of each user;
- e-4) combining the generated column vector according to a path;
- e-5) generating the system matrix according to each antenna by combining the combined column vector; and
- e-6) generating the correlation matrix of the system matrix and calculating the sum of the correlation matrix.

* * * * *